US009293010B2

(12) United States Patent
Filipour et al.

(10) Patent No.: US 9,293,010 B2
(45) Date of Patent: Mar. 22, 2016

(54) WAGERING AGENT

(75) Inventors: Cameron Filipour, Las Vegas, NV (US); Vincent Smith, Las Vegas, NV (US); Mark Ross, Las Vegas, NV (US); Craig Schaefer, Las Vegas, NV (US); Brian Johnson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 79 days.

(21) Appl. No.: 13/568,837

(22) Filed: Aug. 7, 2012

(65) Prior Publication Data

US 2014/0045579 A1 Feb. 13, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3267* (2013.01); *G07F 17/3225* (2013.01); *G07F 17/32* (2013.01); *G07F 17/323* (2013.01)

(58) Field of Classification Search
CPC ... G07F 17/32; G07F 17/3225; G07F 17/323; G07F 17/3267
USPC ............................ 463/27, 42, 16–22; 705/14
See application file for complete search history.

(56) References Cited

U.S. PATENT DOCUMENTS

| | | | |
|---|---|---|---|
| 5,280,909 | A | 1/1994 | Tracy |
| 5,344,144 | A | 9/1994 | Canon |
| 5,364,104 | A | 11/1994 | Jones |
| 5,766,076 | A | 6/1998 | Pease et al. |
| 5,855,515 | A | 1/1999 | Pease et al. |
| 5,885,158 | A | 3/1999 | Torango et al. |
| 6,110,043 | A | 8/2000 | Olsen |
| 6,203,010 | B1 | 3/2001 | Jorasch et al. |
| 6,210,275 | B1 | 4/2001 | Olsen |
| 6,435,511 | B1 | 8/2002 | Vancura et al. |
| 6,599,193 | B2 | 7/2003 | Baerlocher et al. |
| 7,070,505 | B2 | 7/2006 | Vancura et al. |
| 7,297,059 | B2 | 11/2007 | Vancura et al. |
| 7,357,716 | B2 | 4/2008 | Marks et al. |
| 7,470,184 | B2 | 12/2008 | Baerlocher et al. |
| 7,568,973 | B2 | 8/2009 | Iddings et al. |
| 7,597,621 | B2 | 10/2009 | Baerlocher |
| 7,651,392 | B2 | 1/2010 | Pennington et al. |
| 7,666,093 | B2 | 2/2010 | Lafky et al. |
| 7,682,248 | B2 | 3/2010 | Baerlocher et al. |
| 7,713,120 | B2 | 5/2010 | Cannon |
| 7,780,520 | B2 | 8/2010 | Baerlocher |
| 7,841,939 | B2 | 11/2010 | Baerlocher et al. |
| 7,914,377 | B2 | 3/2011 | Benbrahim et al. |
| 7,942,737 | B2 | 5/2011 | Cregan et al. |

(Continued)

*Primary Examiner* — Milap Shah
*Assistant Examiner* — Jason Pinheiro
(74) *Attorney, Agent, or Firm* — Neal, Gerber & Eisenberg LLP

(57) ABSTRACT

A gaming machine, such as a video slot or video poker machine, may be configured to execute an interface. The gaming machine may be configured to receive, a plurality of times, player input to play a first wagering game on the gaming machine. The gaming machine may be further configured to generate, each time the player input is received, game results for the first wagering game. The gaming machine may also be configured to generate game results for a second wagering game. The gaming machine may also be configured to present an animation of the wagering agent engaging in wagering activities.

20 Claims, 5 Drawing Sheets

(56) References Cited

U.S. PATENT DOCUMENTS

| | | | |
|---|---|---|---|
| 7,963,845 B2 | 6/2011 | Baerlocher | |
| 8,033,903 B2 | 10/2011 | Cregan | |
| 8,070,597 B2 | 12/2011 | Cuddy | |
| 8,092,302 B2 | 1/2012 | Cuddy et al. | |
| 8,096,874 B2 | 1/2012 | Nicely et al. | |
| 8,113,939 B2 | 2/2012 | Cannon | |
| 8,128,491 B2 | 3/2012 | Vasquez et al. | |
| 8,137,188 B2 | 3/2012 | Breckner et al. | |
| 8,157,646 B2 | 4/2012 | Pawloski et al. | |
| 8,197,337 B2 | 6/2012 | DeWaal et al. | |
| 8,231,453 B2 | 7/2012 | Wolf et al. | |
| 8,360,846 B1 | 1/2013 | Bennett et al. | |
| 8,360,865 B2 | 1/2013 | Walker et al. | |
| 8,435,111 B2 | 5/2013 | Filipour et al. | |
| 8,454,434 B1 | 6/2013 | Schaefer et al. | |
| 8,500,548 B2 | 8/2013 | Baerlocher et al. | |
| 8,517,828 B2 | 8/2013 | Dewaal et al. | |
| 8,545,308 B2 | 10/2013 | Walker et al. | |
| 8,545,321 B2 | 10/2013 | Baerlocher et al. | |
| 8,608,552 B2 | 12/2013 | Walker et al. | |
| 2002/0147047 A1* | 10/2002 | Letovsky et al. | 463/42 |
| 2006/0183535 A1 | 8/2006 | Marks et al. | |
| 2008/0090651 A1 | 4/2008 | Baerlocher | |
| 2008/0108430 A1 | 5/2008 | Evans | |
| 2008/0108431 A1 | 5/2008 | Cuddy et al. | |
| 2009/0042645 A1 | 2/2009 | Graham et al. | |
| 2009/0124362 A1 | 5/2009 | Cuddy et al. | |
| 2009/0124363 A1* | 5/2009 | Baerlocher et al. | 463/27 |
| 2009/0124364 A1 | 5/2009 | Cuddy et al. | |
| 2010/0069135 A1* | 3/2010 | Davis et al. | 463/16 |
| 2011/0003637 A1 | 1/2011 | LeFever | |
| 2011/0111843 A1 | 5/2011 | Nicely et al. | |
| 2012/0115580 A1* | 5/2012 | Hornik et al. | 463/25 |
| 2012/0122590 A1* | 5/2012 | Nguyen | 463/42 |
| 2013/0084963 A1 | 4/2013 | Shorrock et al. | |
| 2013/0150153 A1 | 6/2013 | Walker et al. | |
| 2013/0165210 A1* | 6/2013 | Nelson et al. | 463/25 |
| 2013/0225277 A1 | 8/2013 | Hughes | |
| 2013/0296028 A1 | 11/2013 | Baerlocher | |
| 2013/0310158 A1 | 11/2013 | Walker et al. | |
| 2014/0011571 A1 | 1/2014 | Roper et al. | |
| 2014/0011580 A1 | 1/2014 | Walker et al. | |
| 2014/0018176 A1 | 1/2014 | Walker et al. | |
| 2014/0045584 A1 | 2/2014 | Walker et al. | |

* cited by examiner

WAGERING AGENT

BACKGROUND

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personal (e.g., gaming control personal) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

In many casinos and other entertainment locations, the gaming machines may be networked to one or more devices that monitor the functions of the gaming machines during operation. For example, a system may monitor and regulate the amount of money received by a gaming machine and the amount of money paid out by the gaming machine. The system may also monitor and regulate multi-player gaming, pooling of player wagers, etc. on the gaming machine. For example, networking and/or control software may be used to regulate game performance across all players, such as graphics that allows each player to participate in the same scene in the game. Networking and/or control software may be used to unify separate gaming machines such that the multi-player gaming may appear as one game to the system. Networking may also allow two or more gaming machines to be combined under the same model, which allows several players to play the same game, while at different gaming machines.

SUMMARY

According to various example embodiments, a method for providing a wagering agent at a gaming machine is disclosed. The method includes receiving, a plurality of times, player input to play a first wagering game on the gaming machine, wherein the player input comprises receiving a wager. The method further includes generating, each time the player input is received, game results for the first wagering game, the first wagering game being initiated when the player input is received. The method also includes generating game results for a second wagering game, the second wagering game being initiated based on credits allocated to game play for the second wagering game, the credits being allocated as a result of game play of the first wagering game. The method includes presenting an animation of the wagering agent engaging in wagering activities, wherein the animation of the wagering activities of the wagering agent depicts the game results of the second wagering game.

According to one example embodiment, a controller for a gaming machine is disclosed. The controller includes a processor configured to receive, a plurality of times, player input to play a first wagering game on the gaming machine, wherein the player input comprises receiving a wager. The processor further configured to generate, each time the player input is received, game results for the first wagering game, the first wagering game being initiated when the player input is received. The processor also configured to generate game results for a second wagering game, the second wagering game being initiated based on credits allocated to game play for the second wagering game, the credits being allocated as a result of game play of the first wagering game. The processor also configured to present an animation of the wagering agent engaging in wagering activities, wherein the animation of the wagering activities of the wagering agent depicts the game results of the second wagering game.

According to another example embodiment, a computer-readable storage medium is disclosed. The storage medium has machine instructions stored therein, the instructions being executable by a processor to cause the processor to perform operations. The operations include receiving, a plurality of times, player input to play a first wagering game on the gaming machine, wherein the player input comprises receiving a wager. The operations also include generating, each time the player input is received, game results for the first wagering game, the first wagering game being initiated when the player input is received. The operations further include generating game results for a second wagering game, the second wagering game being initiated based on credits allocated to game play for the second wagering game, the credits being allocated as a result of game play of the first wagering game. The operations also include presenting an animation of the wagering agent engaging in wagering activities, wherein the animation of the wagering activities of the wagering agent depicts the game results of the second wagering game.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

Figure 1:
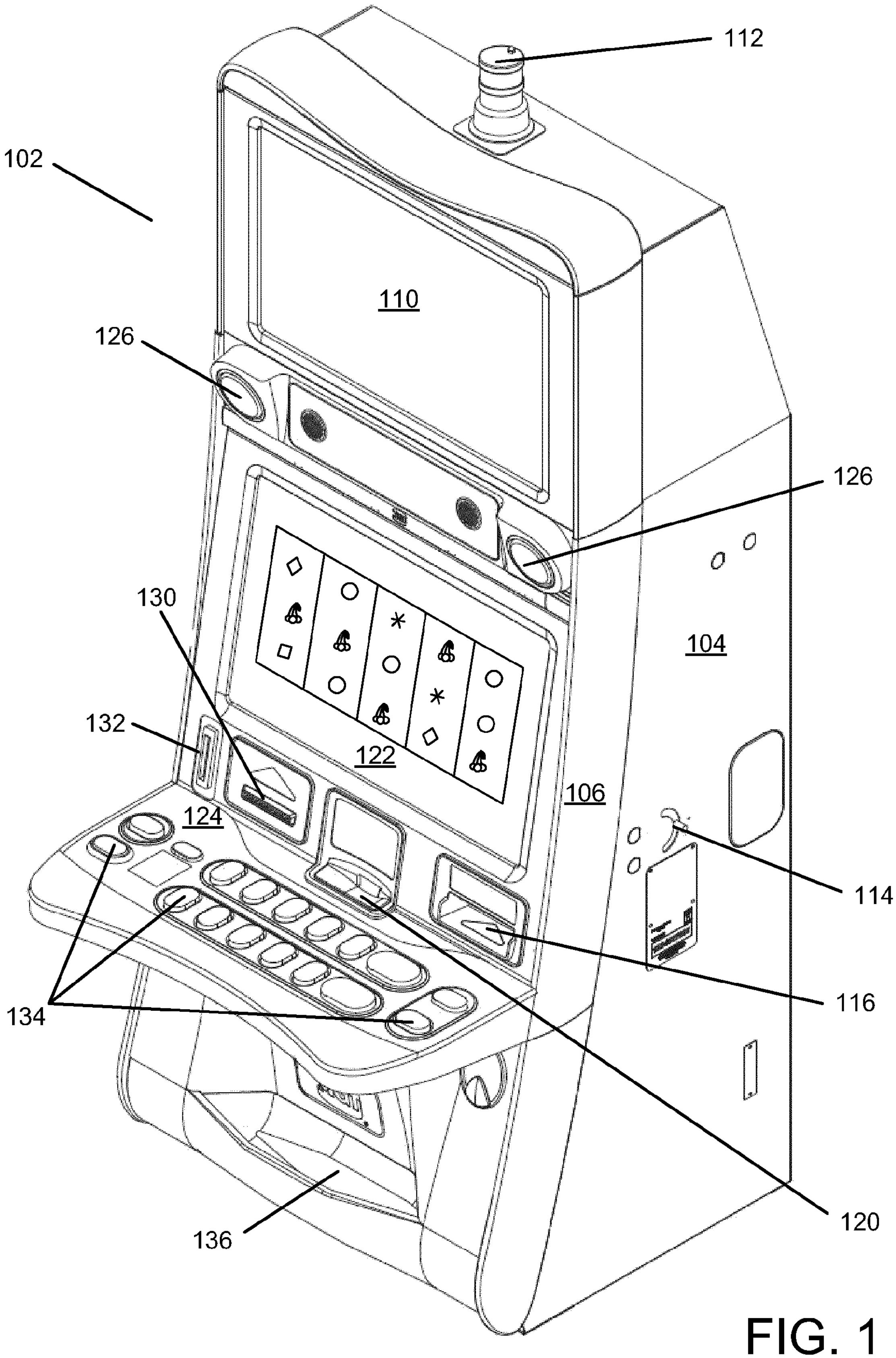
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include a first electronic display 110, a second electronic display 122, speakers 126, and/or a candle device 112 to convey information to the user of gaming machine 102. Gaming machine 102 may also include a console 124 having one or more inputs 134 (e.g., buttons, track pads, etc.) configured to receive input from a user. A controller (not shown) within gaming machine 102 may run a game, such as a wager-based game, in response to receiving input from a user via inputs 134 or displays 110, 122. For example, inputs 134 may be operated to place a wager in the game and to run the game. In response, the controller may cause reels shown on display 122 to spin, such as with a slot game, and/or display 110 to display the results of the game.

Gaming machine 102 may also include devices for conducting a wager-based game. For example, gaming machine 102 may include a ticket acceptor 116 and a printer 120. In various embodiments, gaming machine 102 may be configured to run on credits that may be redeemed for money and/or other forms of prizes. Ticket acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, a free room upgrade, discounts, etc.).

Figure 2:
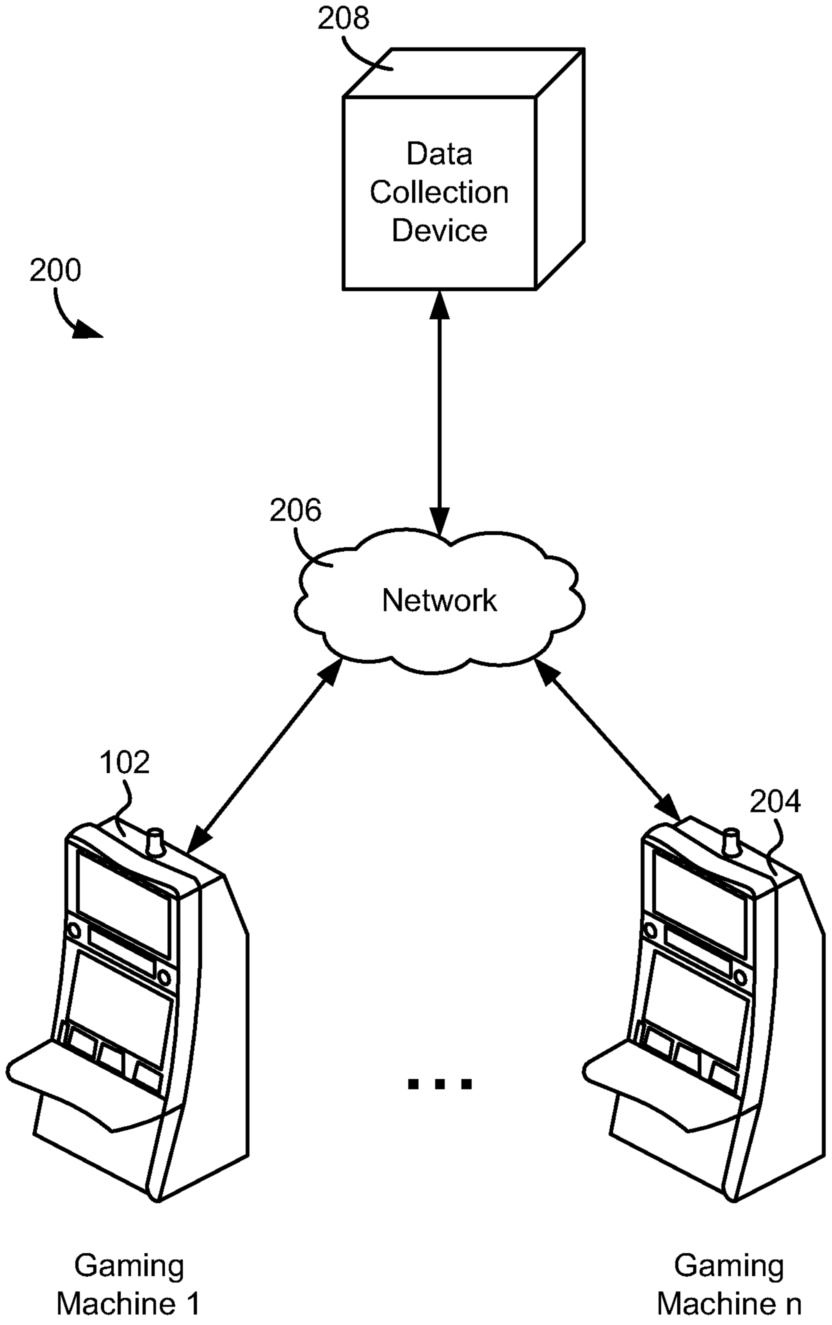
FIG. 2 is an illustration of a gaming environment, according to an exemplary embodiment.

Referring now to FIG. 2, an illustration of a gaming environment 200 is shown, according to an exemplary embodiment. Gaming environment 200 may be within, for example, a casino, a racetrack, a hotel, or other entertainment location. As shown, gaming environment 200 may include any number of gaming machines. For example, gaming environment 200 may include gaming machine 102 shown in FIG. 1 through a gaming machine 204 (i.e., a first gaming machine through nth gaming machine). Gaming environment may also include a network 206 through which gaming machines 102, 204 communicate with a repository 208. In some embodiments, gaming machines 102, 204 may also communicate with each other via network 206.

Network 206 may be any form of communications network that conveys data between gaming machines 102, 204 and repository 208. Network 206 may include any number wired or wireless connections. For example, repository 208 may communicate over a wired connection that includes a serial cable, a fiber optic cable, a CAT5 cable, or any other form of wired connection. Similarly, repository 208 may communicate via a wireless connection (e.g., via WiFi, cellular, radio, etc.). Network 206 may also include any number of intermediary networking devices, such as routers, switches, servers, etc.

Repository 208 may be one or more electronic devices connected to network 206 configured to collect data from gaming machines 102, 204. For example, repository 208 may be a single computer, a collection of computers, or a data center. Repository 208 may include one or more data storage devices in communication with one or more processors. The data storage devices may store machine instructions that, when executed by the one or more processors, cause the one or more processors to perform the functions described with regard to repository 208. Generally, repository 208 is configured to receive and store data regarding gaming machines 102, 204 and to provide the data to a user interface (e.g., a display, a handheld device, etc.). In some cases, repository 208 may perform data analysis on the received data. For example, repository 208 may determine averages, trends, metrics, etc., for one or more of gaming machines 102, 204. Data may be sent by gaming machines 102, 204 to repository 208 in real-time (e.g., whenever a change in credits or cash occurs, whenever another type of system event occurs, etc.), periodically (e.g., every fifteen minutes, every hour, etc.), or in response to a request from repository 208.

The data received by repository 208 may include operational data. In general, operational data may be any other form of data indicative of the operational state of gaming machines 102, 204. For example, operational data may include data indicative of the number of games played on gaming machines 102, 204, the types of games played on gaming machines 102, 204, errors or alerts generated by gaming machines 102, 204, whether gaming machines 102, 204 are currently in use, etc. Repository 208 may use the received operational data to allow gaming machines 102, 204 to be monitored. Repository 208 may also provide notifications, if maintenance is required for any of gaming machines 102, 204. For example, a notification may be sent to a display (e.g., a display attached to repository 208, a display of a handheld device operated by a technician, etc.), so that an error may be corrected.

In some embodiments, the data received by repository 208 may include data related to a user's loyalty account. For example, a user of gaming machine 102 may link their loyalty account to gaming machine 102, so that she can gain loyalty points, free turns, etc., while playing gaming machine 102. A user may link his or her loyalty account to gaming machine 102 in any number of ways. For example, the user may insert a loyalty card into gaming machine 102 and/or provide biometric data to gaming machine 102 (e.g., by conducting a finger print scan, a retinal scan, etc.). In some cases, a mobile device operated by the user may provide data regarding the user's loyalty account to gaming machine 102. The mobile device may transfer data to gaming machine 102 wirelessly (e.g., via Bluetooth, WiFi, etc.), via a wired connection (e.g., via a USB cable, a docking station, etc.), via the user's body (i.e., the mobile device transmits data through the user's body and into gaming machine 102), or in another manner. Repository 208 may then associate the user's time playing gaming machine 102 with the user's loyalty account (e.g., to add loyalty points to the user's account, to provide certain rewards to the user, such as a bonus turn, etc.).

Repository 208 may provide data to gaming machines 102, 204 via network 206. For example, repository 208 may notify a user of gaming machine 102 that the user qualifies for a loyalty award, such as a free meal, a free night in a hotel, a discount, a bonus turn, and so on. In some cases, repository 208 may provide a service window to gaming machines 102, 204. For example, the service window may appear within a Flash application executed by gaming machines 102, 204 via the lower display of the machines. A service window may allow notifications to be provided by repository 208 to an individual user during game play.

Figure 3:
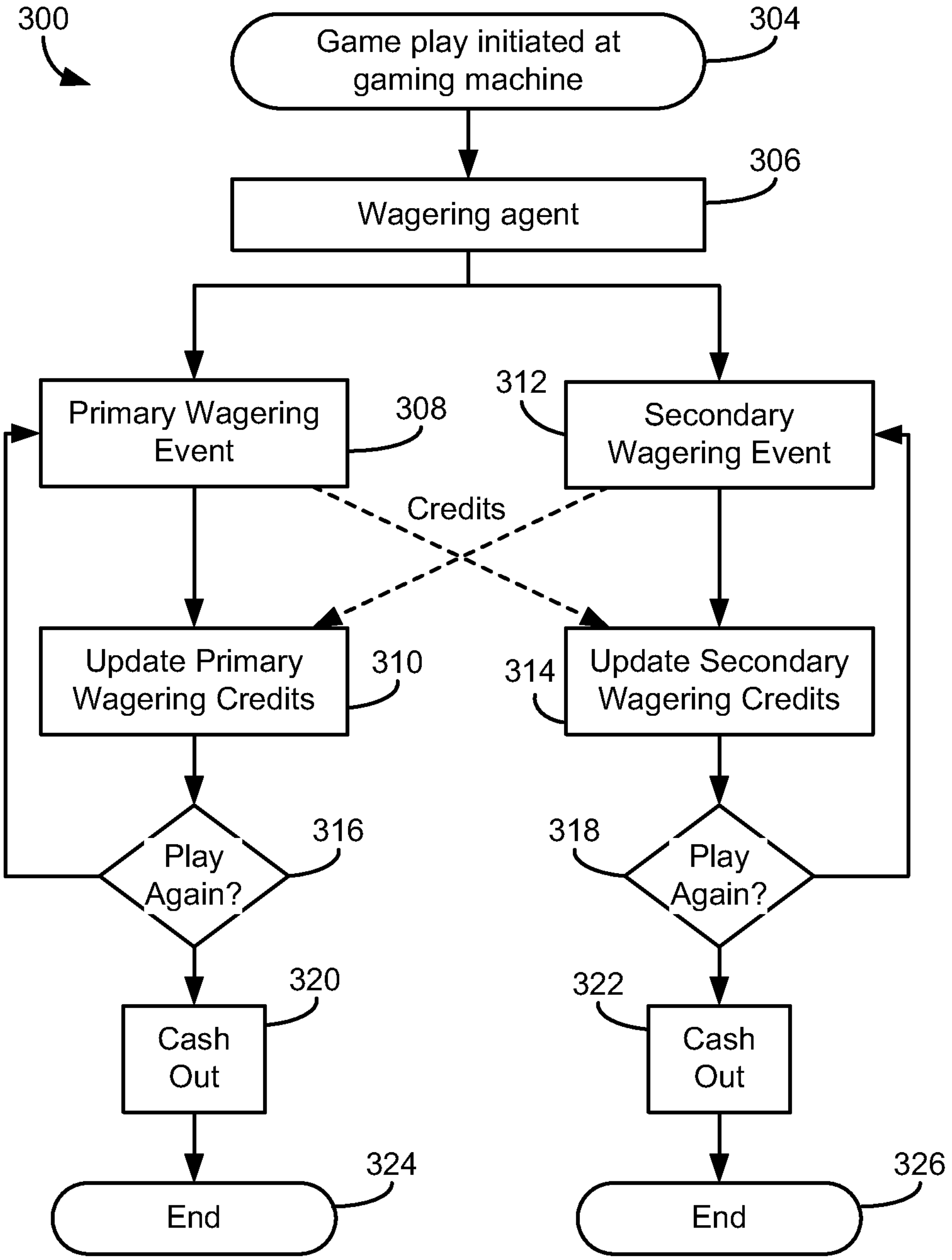
FIG. 3 is a flow chart of providing a wagering agent, according to an exemplary embodiment.

FIG. 3 is a flow diagram of providing a wagering agent, according to an exemplary embodiment. Flow diagram 300 includes a number of steps but is not limited to these steps and is not necessarily performed in the order indicated. In some implementations, more or fewer steps may be included. In the example of FIG. 3, players are provided with wagering agents that periodically engage in wagering events on behalf of the player. For example, the wagering agent may be a virtual pet, an avatar resembling the player, and so on. The wagering events engaged in by the wagering agent may be funded with a percentage of the base game coin-in of the player (e.g., 5% of every wager placed by the player may be redirected to fund the wagering activities of the wagering agent). The wagering event may be separate from the primary wagering events engaged in by the player. For example, in the context of a slot machine, in which the primary wagering event involves spinning reels, the wagering agent may be a cute animated virtual pet that periodically runs offscreen and returns with mystery items and rewards. When the wager is successful, the pet brings back items and rewards that provide real monetary value to the player.

The process of FIG. 3 may be initiated at 304, for example, when a player initiates a gaming session at gaming machine 102 (e.g., by inserting a ticket, cash, loyalty card, etc., into the slot machine). At 306, a wagering agent is generated for the player. The type of wagering agent generated for the player may be based in part on whether the player is recognized by the gaming machine 102. For example, if the player inserts a loyalty card into the gaming machine 102, the player may be identified and a previously-customized wagering agent may be accessed for the player. For example, if the player likes golden retrievers, the player may have previously configured her wagering agent to be an animated golden retriever. For purposes of providing an example, it is assumed in the discussion of FIG. 3 that the gaming machine 102 provides a virtual pet as a wagering agent to the player. If the player is not recognized, or if the player has not previously configured a wagering agent, the player may be given a default wagering agent.

At 308, the player may play the primary wagering game on the gaming machine, which may include providing a wager. For example, the player may pull an arm or push a button on the gaming machine, causing a wagering event to occur (e.g., a spinning of slot machine reels). In an example embodiment, funding for the wagering agent is provided via wagering of the player on the gaming machine. For example, the player may use a percentage of their credits, money, etc., such that the more the player bets on the game, the more likely the player is rewarded by the customizable wagering agent. In an example embodiment, a percentage of the player's base wagers are used as deferred wagers. For example, if a player provides a wager of $1.00, then $0.05 may be designated as deferred wagers. The deferred wagers may be represented to the player via the wagering agent.

At 310, the primary wagering credits may be updated. For example, the gaming machine 102 may alert the player as to how many credits the player has remaining to play the game on the gaming machine. In another example, the primary wagering credits may be updated based on the wagering agent and its ability to retrieve additional credits, items, awards, i.e., a secondary wagering event.

At 312, a secondary wagering event may take place. For example, the wagering agent may retrieve credits, items, awards, etc. at intervals of time. In some implementations, wagering agent may overlay the gaming screen using flash technology or the wagering agent may appear in a service window. In some implementations, the retrieval of the item, credit, award, etc. may be performed off-screen. In some implementations, the intervals of time may be determined based on when sufficient credits have been accumulated for the secondary wagering event to occur. In other implementations, the intervals of time may also be predetermined, such as every 5 minutes, assuming the player has sufficient credits. For example, in a dog-themed game, the player's customizable wagering agent, a dog, may retrieve an item every 5 minutes. The item may be a credit, an award, etc. that may be applied to the player's credits on the gaming machine. The deferred wagers may be represented to the player through the pet trying to retrieve items, awards, credits, etc. For example, in a "Golden Retriever" themed game, the player's animated dog may run offscreen and return with a mystery item. If the dog returns with an old boot or fish bones, then the player receives nothing. If the dog returns with gold coins, then the player is awarded credits on the gaming machine, as part of 310.

At 314, the secondary wagering credits may be updated and displayed to the player. For example, a meter may be displayed to represent the player's level of secondary wagering credits. For example, in the pet-themed game, the wagering agent may have a "happiness" meter. In the casino, wagers placed by the player may purchase secondary wagering credits for the wagering agent, which is displayed on-screen and may ensure that the meter remains above a threshold. That is, the player increases the pet's happiness by betting. In some implementations, the wagering agent will only perform actions for the player, such as making wagers, when the happiness meter exceeds a threshold.

Future wagering equity, such as deferred wagers, may be accumulated and displayed to the player by way of the happiness meter. For example, the player may need to increase the level of secondary wagering credits before placing a wager, such as, e.g., increasing the "happiness" of the wagering agent. If the meter does not exceed a threshold, e.g., "wagering equity" is not reached, prior to an interval of time, then the wagering agent will not retrieve an item, credit, award, etc. In some implementations, the player is encouraged to wager to increase the likability, attractiveness, etc. of their wagering agent. The player may also earn items for the wagering agent by reaching the base game wagering threshold.

At 316, 318, the player may continue playing the game on the gaming machine by providing a wagering event at 308, 312. The player may also determine to cash out at 320, 322. If the player attempts to cash out while the wagering agent includes deferred wagers, then a forced wager event may occur to clear out the equity, e.g., the wagering agent may retrieve one last item, credit, reward, etc. before the cash out is processed. In some implementations, there may be unclaimed revenue when the player cashes out. The unclaimed revenue (awards, items, etc.) may be used to increase the enjoyment of future games. In this example, the player's wagering agent may engage in another wagering event to determine an award and determine if previously unclaimed funds are available. If unclaimed funds are available, then a supplementary award may be determined. The standard award may be added to the supplementary award and provided to the player through a single payout during one of the wagering agent's retrieval missions.

At 324, the player finishes playing gaming machine 102 that provides the primary wagering event. For example, the player may leave the gaming machine or the casino. In some implementations, the secondary wagering game may also be ended at 326. However, in other implementations, the secondary wagering game may be continued outside of a casino by the wagering agent.

Figure 4:
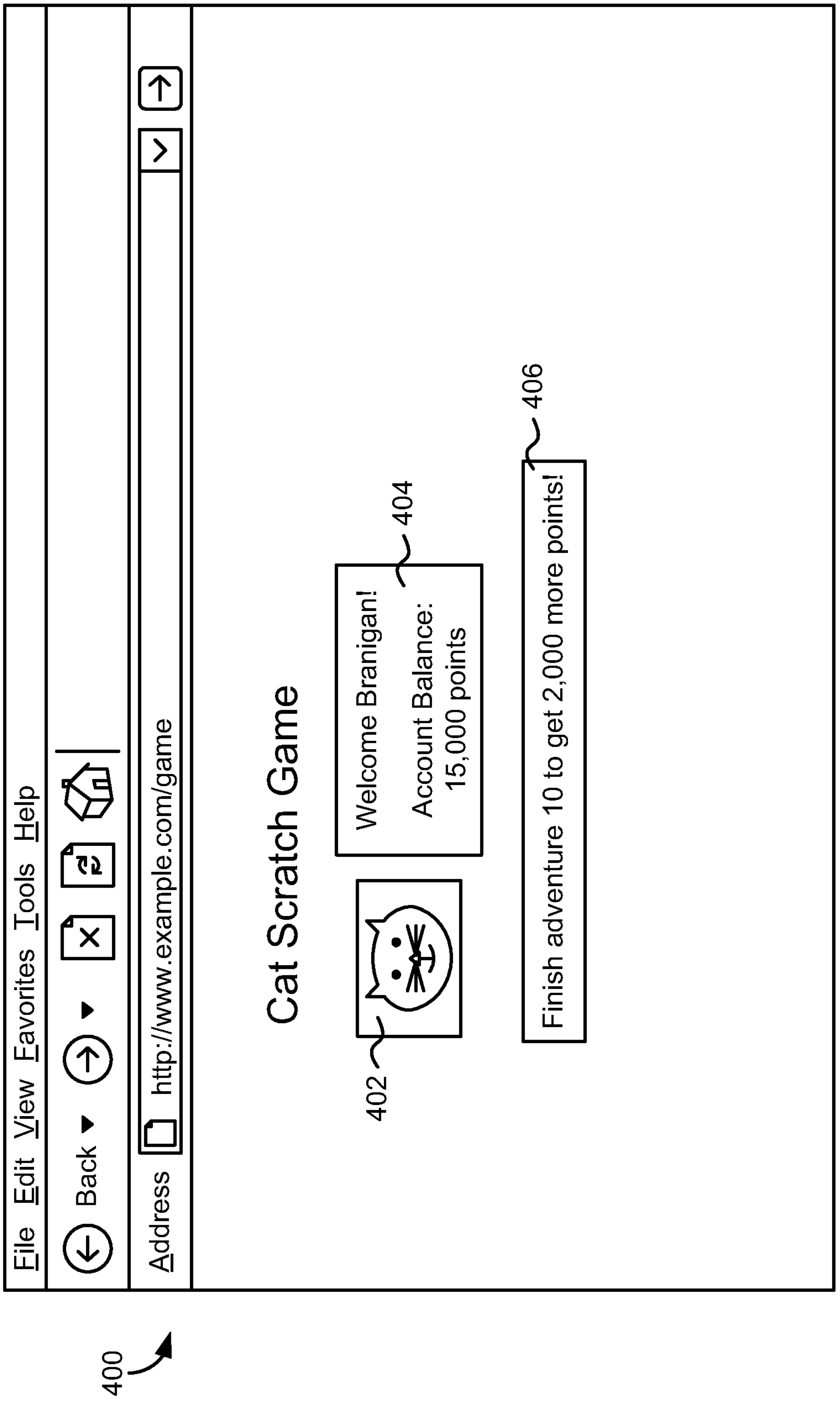
FIG. 4 is an example of a website, according to an embodiment.

FIG. 4 is an example of a website, according to an embodiment. In general, the wagering agent and/or its characteristics may remain intact from session to session on the gaming machine as well as outside of the gaming environment. For example, the player's profile and wagering agent may be stored using a cloud computing solution, which enable a repository to store game data, player data, etc. In this implementation, the wagering agent may be engaged, monitored, modified, etc. by an appropriate device, such as a mobile computing device, a desktop computer, a gaming machine, etc. FIG. 4 illustrates an online interface that allows the player to access the game from a kiosk, a mobile computing device (e.g., the player's mobile device, a mobile device provided by the gaming maching environment, etc.), a workstation, etc.

FIG. 4 may be the home page and/or welcome screen of website 400, such as a social network website, a gaming manufacturer's website, etc. In some implementations, the home page may include a registration link if the player profile, IP address, etc. are not recognized. If the player does not have an account, a registration screen may be provided to the player. If the player does have an account, a log-in screen may be provided to the player. The player is provided with a welcome and the player's associated wagering agent 402. Area 404 provides a welcome and a high-level summary of the player's profile, e.g., statistics. Area 406 provides the player with additional information to build their wagers, wagering agent, etc.

As discussed above, if a player attempts to cash out of a gaming machine while the wagering agent has equity, then the results of the deferred wager events (e.g., the retrieval of items, awards, rewards, etc. by the wagering agent) may be provided on website 400 or as a link on website 400. In some implementations, the deferred wager events may be provided to a mobile computing device, a social networking website, etc. The player may retrieve the award at a participating casino to collect the award. In some implementations, the deferred award may be awarded as cashable credits to the player's loyalty account. If the award remains unclaimed after an interval of time, then it may be rolled back into an award either in the game on website 400 or the game on the gaming machine.

Once the player exits an environment that houses the gaming machine, the intervals between wagering events may be extended. For example, if the wagering event occurs every 5 minutes during the game on the gaming machine, the interval may be extended to every 2 hours once the player has left the casino. For example, at intervals of 2 hours, the player may receive text messages on the player's mobile device advising that the animated pet went on a mission and advising whether the animated pet retrieved valuable items. This may have the effect of reminding the player of the positive gaming experience in the casino and provide incentive to the player to return to the casino to retrieve the award.

Website 400 may also include a link to related games or contests. The player may enter their wagering agent into an online contest, which may require an additional fee. In some implementations, the contest provides cash awards that may be applied to the gaming machine. For example, the player may enter their wagering agent into a race for a wager and, if the wagering agent wins, the player may redeem the win for actual cash. The online contest may include player vs. gaming manufacturer, player vs. other players, etc.

The pet's happiness meter may persist outside of the location of the gaming machine (e.g., casino). In some implementations, the player may ensure the meter exceeds the threshold by, e.g., purchasing items for the wagering agent as micro-transactions online, purchasing other items from the game manufacturer, etc. For example, the player may purchase dog food for the player's pet to ensure the pet's happiness. The purchases, including the micro-transactions, may provide value to the player by allowing the player to increase levels in the game, wager in the game, etc. Players may use the pets to participate in a variety of "play for fun" games and other online activities, which may earn the ability to further customize their pets as well as win vanity items for their pets.

The wagering agent along with the items, rewards, credits, etc. may be meta-tagged with an identifier of the casino, such that the wagering agent, items, etc. become property of the casino so that revenue (e.g., cash-outs, rewards, credits, payouts, etc.) may be linked to that property for accounting purposes. In some implementations, casinos and/or game manufacturers may split revenue. For example, if a wagering agent is created, built, etc. at Casino A and receives items, etc. via a micro-transaction, then Casino A may share the resulting revenue with another casino, game manufacturer, etc.

The wagers may include standalone wagering events, in which a collected wager amount is wagered against a fixed pay table, machine, etc. In another implementation, the wagers may be provided at all participating games/machines that may be linked together. A percentage of coin-in from all of the participating games/machines may be pooled so that players may receive a percentage of the pool's funds each time the wagering agent retrieves an item off-screen (based on a random number generator event).

Figure 5:
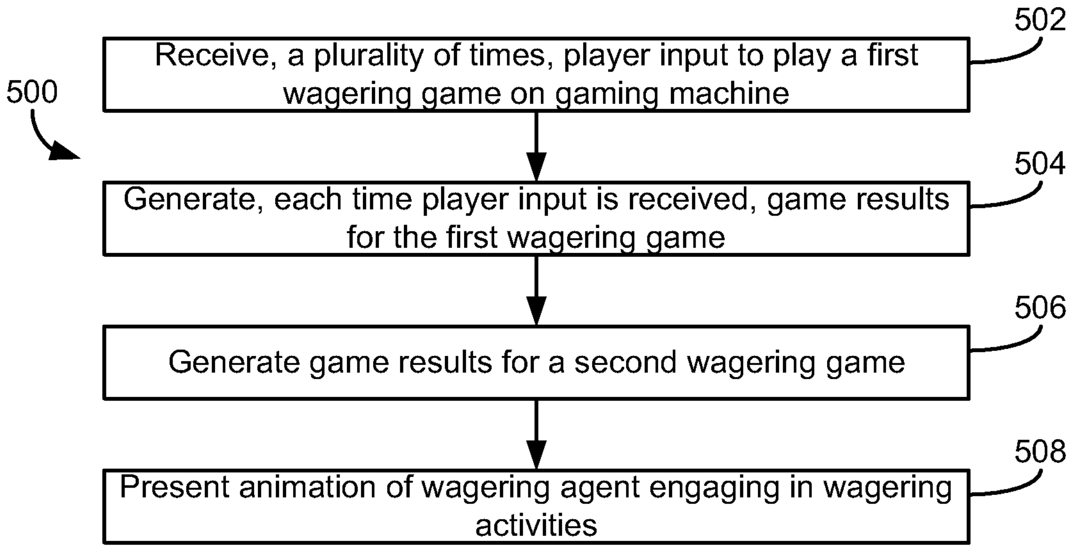
FIG. 5 is a flow diagram of a method for providing a wagering agent, according to one embodiment.

Referring now to FIG. 5, a flow diagram of a process 500 for providing a wagering agent is shown, according to an exemplary embodiment. Process 500 may be implemented by one or more processors executing machine instructions stored within one or more computer storage devices. For example, process 500 may be implemented by a gaming machine, such as gaming machine 102 shown in FIGS. 1 and 2. In general, process 500 may allow games to be deployed to gaming machines and associated with games found on a website (e.g., the gaming manufacturer's website, social networking website, etc.). Thus, the existing system architecture of the gaming environment may be provided to a player even after the player has left the location of the gaming machine.

Process 500 includes receiving player input to play a first wagering game (e.g., a slot machine game) on a gaming machine at 502. The player input may be received a plurality of times. For example, a player playing a slot machine may pull a mechanical arm of the slot machine a plurality of times. The player input may include a wager. For example, for a dollar slot machine, each pull of the mechanical arm may have an associated one dollar wager. In some implementations, the player input may be received by an interface on the gaming machine, e.g., mechanical arm, touch screen, display, etc. The interface may show representations of various images to the player and may receive input from the user. For example, the interface may include a touch screen display, so that the player may press the images to interact with them on the display. In some implementations, input to the interface may be provided using a trackball, mouse, keyboard, mechanical arm, etc.

Process 500 includes generating game results for the first wagering game (block 504). The game results may be generated each time a player input is received. For example, when the player pulls the mechanical arm on a slot machine, this may initiate spinning of the reels. The gaming machine may generate and display results (e.g., a particular combination of reel positions.)

Process 500 includes generating game results for a second wagering game (block 506). The second wagering game may be initiated based on credits allocated to game play for the second wagering game. The credits may be allocated as a results of game play of the first wagering game. For example, for a dollar slot machine, five cents of every dollar may be allocated for use by the wagering agent every time the mechanical arm is pulled. Process 500 may also include allocating a first portion of the wager to the first wagering game and a second portion of the wager to the second wagering game. The allocation may take place each time the player input is received. This method may also include accumulating gaming credits for the second wagering game.

Process 500 also includes presenting an animation of the wagering agent engaging in wagering activities. (block 508). The animation of the wagering activities of the wagering agent depicts the game results of the second wagering game. For example, for a wagering agent that is a golden retriever, the golden retriever may bring back a pot of gold (win) or fish bones and dirty sneakers (loss).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing agent. Alternatively or in addition, the program instructions can be encoded on an artificially-generated propagated signal, e.g., a machine-generated electrical, optical, or electromagnetic signal, that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term "client or "server" include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computer-implemented method of operating a gaming system, said method comprising:

receiving, via an acceptor of a gaming machine, a first physical item associated with a first monetary value;

establishing, via at least one processor, a credit balance for a player based at least in part on the first monetary value associated with the received first physical item;

receiving a plurality of actuations of a wager button of the gaming machine, each actuation associated with a wager deducted from the credit balance;

for each received actuation of the wager button, initiating, via the at least one processor, a play of a first wagering game, and generating, via the at least one processor, game results for said play of the first wagering game;

generating, via the at least one processor, first game results for a first play of a second wagering game, the first play of the second wagering game being initiated based on credits allocated to game play for the second wagering game as a result of game play of the first wagering game;

displaying, via at least one display device of the gaming machine, an animation of a wagering agent associated with the player engaging in wagering activities, the wagering agent being associated with the player via a player account of the player, wherein the animation of the wagering activities of the player's wagering agent depicts the first game results of the first play of the second wagering game;

upon receiving an actuation of a cashout button indicating that the player has ended play at the gaming machine and based on the allocated credits being above a wagering threshold, automatically generating, via the at least one processor, deferred second game results for a second play of the second wagering game absent additional input from the player, the deferred second game results being independent of any game results of any prior plays for the second wagering game; and providing the deferred second game results to the player via a remote computer.

2. The method of claim 1, further comprising:

allocating, for each received actuation of the wager button, a first portion of the wager to the first wagering game and a second portion of the wager to the second wagering game.

3. The method of claim 2, further comprising:

accumulating, via the at least one processor, gaming credits for the second wagering game; and enabling the player to use the accumulated gaming credits to customize the player's wagering agent.

4. The method of claim 3, wherein the gaming credits are accumulated each time player input is received based on the second portion of the wager.

5. The method of claim 1, wherein the second wagering game being initiated is a result of the allocated credits reaching the wagering threshold.

6. The method of claim 5, wherein the wagering threshold is based on a player profile.

7. The method of claim 6, wherein the player profile comprises a loyalty account.

8. The method of claim 1, further comprising:

retrieving, via the at least one processor, the animation of the wagering agent from memory; and transferring, via the at least one processor, the animation of the wagering agent to a new gaming session.

9. A gaming machine comprising:

a housing;

at least one display device supported by the housing;

a plurality of input devices supported by the housing, the plurality of input devices including an acceptor, a wager button, and a cashout button;

a processor; and at least one memory device storing a plurality of instructions which, when executed by the processor, cause the processor to operate with the display device and the plurality of input devices to:

receive, via the acceptor, a first physical item associated with a first monetary value;

establish a credit balance for a player based at least in part on the first monetary value associated with the received first physical item;

receive a plurality of actuations of the wager button, each actuation associated with a wager;

for each received actuation of the wager button, initiate a play of the first wagering game and generate game results for said play of the first wagering game;

generate first game results for a first play of a second wagering game, the first play of the second wagering game being initiated based on credits allocated to game play for the second wagering game as a result of game play of the first wagering game;

display an animation of a wagering agent of the player engaging in wagering activities, the wagering agent being associated with the player via a player account of the player, wherein the animation of the wagering activities of the player's wagering agent depicts the first game results of the first play of the second wagering game;

upon receiving an actuation of the cashout button indicating that the player has ended play at the gaming machine and based on the allocated credits being above a wagering threshold, automatically generate deferred second game results for a second play of the second wagering game absent additional input from the player, the deferred second game results being independent of any game results of any prior plays of the second wagering game; and provide the deferred second game results to the player via a remote computer.

10. The gaming machine of claim 9, wherein the plurality of instructions, when executed by the processor, cause the processor to:

allocate, for each received actuation of the wager button, a first portion of the wager to the first wagering game and a second portion of the wager to the second wagering game.

11. The gaming machine of claim 10, wherein the plurality of instructions, when executed by the processor, cause the processor to:

accumulate gaming credits for the second wagering game; and enable the player to use the accumulated gaming credits to customize the player's wagering agent.

12. The gaming machine of claim 11, wherein the gaming credits are accumulated each time player input is received based on the second portion of the wager.

13. The gaming machine of claim 9, wherein the second wagering game being initiated is a result of the allocated credits reaching the wagering threshold.

14. The gaming machine of claim 13, wherein the wagering threshold is based on a player profile.

15. The gaming machine of claim 14, wherein the player profile comprises a loyalty account.

16. The gaming machine of claim 9, wherein the plurality of instructions, when executed by the processor, cause the processor to:

retrieve the animation of the wagering agent from memory; and transfer the animation of the wagering agent to a new gaming session.

17. A non-transitory computer-readable storage medium having machine instructions stored therein, the instructions being executable by a processor to cause the processor to perform operations comprising:

establishing a credit balance for a player based at least in part on a first monetary value associated with a first physical item received by an acceptor of a gaming machine;

for each received actuation of a wager button of the gaming machine, initiating a play of a first wagering game, and generating game results for said play of the first wagering game;

generating first game results for a first play of a second wagering game, the first play of the second wagering game being initiated based on credits allocated to game play for the second wagering game as a result of game play of the first wagering game;

causing at least one display device to display an animation of a wagering agent of the player engaging in wagering activities, the wagering agent being associated with the player via a player account of the player, wherein the animation of the wagering activities of the player's wagering agent depicts the first game results of the first play of the second wagering game;

after a cashout button of the gaming machine has been actuated to indicate that the player has ended play at the gaming machine and based on the allocated credits being above a wagering threshold, automatically generating deferred second game results for a second play of the second wagering game absent additional input from the player, the deferred second game results being independent of any game results of any prior plays of the second wagering game; and providing the deferred second game results to the player via a remote computer.

18. The non-transitory computer readable medium of claim 17, wherein the operations further comprise:

allocating, for each received actuation of the wager button, a first portion of the wager to the first wagering game and a second portion of the wager to the second wagering game.

19. The non-transitory computer readable medium of claim 17, wherein the operations further comprise:

accumulating gaming credits for the second wagering game; and enabling the player to use the accumulated gaming credits to customize the player's wagering agent.

20. The non-transitory computer readable medium of claim 19, wherein the gaming credits are accumulated each time player input is received based on the second portion of the wager.

* * * * *